US012789144B2

(12) United States Patent
Rittmann et al.

(10) Patent No.: US 12,789,144 B2
(45) Date of Patent: Nov. 10, 2026

(54) SYSTEMS FOR REMOVING EXPLOSIVES AND OTHER COEXISTING CONTAMINANTS FROM WATER AND RELATED METHODS

(71) Applicant: Arizona Board of Regents on Behalf of Arizona State University, Scottsdale, AZ (US)

(72) Inventors: Bruce Rittmann, Tempe, AZ (US); Chen Zhou, Chandler, AZ (US); Chenwei Zheng, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 698 days.

(21) Appl. No.: 18/253,192

(22) PCT Filed: Nov. 17, 2021

(86) PCT No.: PCT/US2021/059789
§ 371 (c)(1),
(2) Date: May 16, 2023

(87) PCT Pub. No.: WO2022/109069
PCT Pub. Date: May 27, 2022

(65) Prior Publication Data

US 2024/0001308 A1 Jan. 4, 2024

Related U.S. Application Data

(60) Provisional application No. 63/115,017, filed on Nov. 17, 2020.

(51) Int. Cl.
*B01D 69/02* (2006.01)
*B01D 39/16* (2006.01)
(Continued)

(52) U.S. Cl.
CPC ..... *B01D 67/0088* (2013.01); *B01D 39/1623* (2013.01); *B01D 69/02* (2013.01);
(Continued)

(58) Field of Classification Search
USPC ..... 210/500
See application file for complete search history.

(56) References Cited

U.S. PATENT DOCUMENTS

| | | | | |
|---|---|---|---|---|
| 6,423,533 | B1 | 7/2002 | Gearheart | |
| 7,186,340 | B1 * | 3/2007 | Rittmann | C02F 3/102 210/604 |
| 2011/0006001 | A1 | 1/2011 | Rittman | |

FOREIGN PATENT DOCUMENTS

| | | | | |
|---|---|---|---|---|
| WO | WO-2008121373 A2 * | 10/2008 | | B01D 63/024 |
| WO | WO-2017136528 A1 * | 8/2017 | | C02F 3/2806 |

(Continued)

OTHER PUBLICATIONS

Ahn, S. C., Cha, D. K., Kim, B. J., & Oh, S. Y. (2011). Detoxification of PAX-21 ammunitions wastewater by zero-valent iron for microbial reduction of perchlorate. Journal of hazardous materials, 192(2), 909-914.

(Continued)

*Primary Examiner* — Bobby Ramdhanie
*Assistant Examiner* — William Addison Geisbert
(74) *Attorney, Agent, or Firm* — FULLER IP LAW LLC; Rodney J. Fuller

(57) ABSTRACT

The present invention relates to systems and methods for removing oxidized contaminants from water and wastewater using a metal-biofilm, also referred to herein as a bio-metal composite catalyst. In some embodiments, the system comprises a gas-transfer membrane, a hydrogen-gas source, an inoculant comprising a biofilm-forming population of microorganisms, a growth medium comprising at least one
(Continued)

nitrate salt and at least one perchlorate salt, and a catalyst precursor medium comprising at least one soluble autocatalytic metal precursor and having a basic pH. Methods of establishing a bio-metal composite catalyst for removing ammunition-related contaminants are also described.

20 Claims, 7 Drawing Sheets

(51) Int. Cl.

| | |
|---|---|
| ***B01D 67/00*** | (2006.01) |
| ***B01D 69/08*** | (2006.01) |
| ***C02F 1/66*** | (2023.01) |
| ***C02F 3/10*** | (2023.01) |
| ***C02F 3/34*** | (2023.01) |
| ***C02F 101/00*** | (2006.01) |
| *C02F 1/70* | (2023.01) |
| *C02F 103/06* | (2006.01) |

(52) U.S. Cl.
CPC .............. *B01D 69/08* (2013.01); *C02F 3/102* (2013.01); *B01D 2311/06* (2013.01); *B01D 2311/2688* (2013.01); *B01D 2325/027* (2013.01); *B01D 2325/10* (2013.01); *C02F 1/66* (2013.01); *C02F 1/70* (2013.01); *C02F 3/341* (2013.01); *C02F 3/348* (2013.01); *C02F 2101/003* (2013.01); *C02F 2103/06* (2013.01); *C02F 2305/06* (2013.01); *C02F 2305/08* (2013.01)

(56) References Cited

FOREIGN PATENT DOCUMENTS

| | | |
|---|---|---|
| WO | 2019028385 | 2/2019 |
| WO | 2020036770 | 2/2020 |

OTHER PUBLICATIONS

Ahn, S. C., Hubbard, B., Cha, D. K., & Kim, B. J. (2014). Simultaneous removal of perchlorate and energetic compounds in munitions wastewater by zero-valent iron and perchlorate-respiring bacteria. Journal of Environmental Science and Health, Part A, 49(5), 575-583.

An, C. J., He, Y. L., Huang, G. H., & Yang, S. C. (2010). Degradation of hexahydro-1, 3, 5-trinitro-1, 3, 5-triazine (RDX) by anaerobic mesophilic granular sludge from a UASB reactor. Journal of Chemical Technology & Biotechnology, 85 (6), 831-838.

Anotai, J., Tanvanit, P., Garcia-Segura, S., & Lu, M. C. (2017). Electro-assisted Fenton treatment of ammunition wastewater containing nitramine explosives. Process Safety and Environmental Protection, 109, 429-436.

Ashida, N., Ishii, S., Hayano, S., Tago, K., Tsuji, T., Yoshimura, Y., . . . & Senoo, K. (2010). Isolation of functional single cells from environments using a micromanipulator: application to study denitrifying bacteria. Applied microbiology and biotechnology, 85, 1211-1217.

Atikovic, E., Suidan, M. T., & Maloney, S. W. (2008). Anaerobic treatment of army ammunition production wastewater containing perchlorate and RDX. Chemosphere, 72(11), 1643-1648.

Bhanot, P., Celin, S. M., Sreekrishnan, T. R., Kalsi, A., Sahai, S. K., & Sharma, P. (2020). Application of integrated treatment strategies for explosive industry wastewater—A critical review. Journal of Water Process Engineering, 35, 101232.

Cao, T., & Li, J. (Jul. 2018). Experimental study on the treatment of HMX explosive wastewater by Fenton process. In IOP Conference Series: Earth and Environmental Science (vol. 170, No. 3, p. 032115). IOP Publishing.

Chen, Y., Hong, L., Han, W., Wang, L., Sun, X., & Li, J. (2011). Treatment of high explosive production wastewater containing RDX by combined electrocatalytic reaction and anoxic-oxic biodegradation. Chemical Engineering Journal, 168(3), 1256-1262.

Chung, J., Shin, S., & Oh, J. (2009). Characterization of a microbial community capable of reducing perchlorate and nitrate in high salinity. Biotechnology letters, 31, 959-966.

Cupples, A. M. (2013). RDX degrading microbial communities and the prediction of microorganisms responsible for RDX bioremediation. International Biodeterioration & Biodegradation, 85, 260-270. https://doi.org/10.1016/j.ibiod.2013.08.002.

Etnier, E. L. (1989). Water quality criteria for hexahydro-1, 3, 5-trinitro-1, 3, 5-triazine (RDX). Regulatory Toxicology and Pharmacology, 9(2), 147-157.

Fuller, M. E., Hatzinger, P. B., Condee, C. W., & Togna, A. P. (2007). Combined treatment of perchlorate and RDX in ground water using a fluidized bed reactor. Groundwater Monitoring & Remediation, 27(3), 59-64.

Gearheart, R. (2002). Isolation and Use of Perchlorate and Nitrate Reducing Bacteria (U.S. Pat. No. 6,423,533 B1). U.S. Patent and Trademark Office.

González-Toril, E., Santofimia, E., Blanco, Y., López-Pamo, E., Gómez, M. J., Bobadilla, M., . . . & Aguilera, Á. (2015). Pyrosequencing-based assessment of the microbial community structure of Pastoruri glacier area (Huascarán National Park, Perú), a natural extreme acidic environment. Microbial ecology, 70, 936-947.

Hagen, T. (2018). Microbial Inoculant Compositions and Methods (WO Publication No. 2019/028385 A1). World Intellectual Property Organization.

Haibao, H. (2011). A Kind of Supported Reduced Noble Metal Catalyst and Its Preparation Method and Application (CN Reference No. 102139234 B). China National Intellectual Property Administration.

Hawari, J., Halasz, A., Sheremata, T., Beaudet, S., Groom, C., Paquet, L., . . . & Thiboutot, S. (2000). Characterization of metabolites during biodegradation of hexahydro-1, 3, 5-trinitro-1, 3, 5-triazine (RDX) with municipal anaerobic sludge. Applied and environmental microbiology, 66(6), 2652-2657.

Heilmann, H. M., Wiesmann, U., & Stenstrom, M. K. (1996). Kinetics of the alkaline hydrolysis of high explosives RDX and HMX in aqueous solution and adsorbed to activated carbon. Environmental science & technology, 30(5), 1485-1492.

Khue, D.N., Dai Lam, T., Van Chat, N., Bach, V. Q., Loi, V. D., & Van Anh, N. (2014). Simultaneous degradation of 2, 4, 6-trinitrophenyl-N-methylnitramine (Tetryl) and hexahydro-1, 3, 5-trinitro-1, 3, 5 triazine (RDX) in polluted wastewater using some advanced oxidation processes. Journal of Industrial and Engineering Chemistry, 20(4), 1468-1475.

Li, Y., Hsieh, W. P., Mahmudov, R., Wei, X., & Huang, C. P. (2013). Combined ultrasound and Fenton (US-Fenton) process for the treatment of ammunition wastewater. Journal of Hazardous Materials, 244, 403-411.

Liu, N., Qin, X., An, Y., Qiu, H., & Wang, Y. (2018). Effects of multi-electron acceptor coexistence system on perchlorate biodegradation and microbial community variation. Water Science and Technology: Water Supply, 18(4), 1428-1436.

Liu, Z., He, Y., Li, F., & Liu, Y. (2006). Photocatalytic treatment of RDX wastewater with nano-sized titanium dioxide (5 pp). Environmental Science and Pollution Research, 13, 328-332.

Morley, M. C., Henke, J. L., & Speitel Jr, G. E. (2005). Adsorption of RDX and HMX in rapid small-scale column tests: Implications for full-scale adsorbers. Journal of environmental engineering, 131(1), 29-37.

Morley, M. C., Speitel Jr, G. E., & Fatemi, M. (2006). Enhanced desorption of RDX from granular activated carbon. Water environment research, 78(3), 312-320.

Ogawa, M. (2020). Sensor Sheet, Information Processing Device and Occlusal Force Calculation Method (JP Reference No. 2020036770 A). Japan Patent Office.

Oh, S. Y., Cha, D. K., Chiu, P. C., & Kim, B. J. (2006). "Zero-valent iron treatment of RDX-containing and perchlorate-containing wastewaters from an ammunition-manufacturing plant at elevated temperatures." Water science and technology, 54(10), 47-53.

(56) References Cited

OTHER PUBLICATIONS

Panja, S., Sarkar, D., & Datta, R. (2018). Vetiver grass (*Chrysopogon zizanioides*) is capable of removing insensitive high explosives from munition industry wastewater. Chemosphere, 209, 920-927.
Pennington, J. C., & Brannon, J. M. (2002). Environmental fate of explosives. Thermochimica acta, 384(1-2), 163-172.
Pouretedal, H. R., Keshavarz, M. H., Yousefi, M. H., Shokr, E. A., & Zali, A. (2009). Photodegradation of HMX and RDX in the presence of nanocatalyst of zinc sulfide doped with copper.
Prusse, U., Hähnlein, M., Daum, J., & Vorlop, K. D. (2000). Improving the catalytic nitrate reduction. Catalysis today, 55(1-2), 79-90.
Rahaim, R. J., & Maleczka, R. E. (2005). Pd-catalyzed silicon hydride reductions of aromatic and aliphatic nitro groups. Organic letters, 7(22), 5087-5090.
Rittman, B. (2011). Method and System for Surface Water Treatment (U.S. Publication No. 2011/0006001 A1). U.S. Patent and Trademark Office.
Smith, R. L., Buckwalter, S. P., Repert, D. A., & Miller, D. N. (2005). Small-scale, hydrogen-oxidizing-denitrifying bioreactor for treatment of nitrate-contaminated drinking water. Water Research, 39(10), 2014-2023.
Strukul, G., Gavagnin, R., Pinna, F., Modaferri, E., Perathoner, S., Centi, G., . . . & Tomaselli, M. (2000). Use of palladium based catalysts in the hydrogenation of nitrates in drinking water: from powders to membranes. Catalysis today, 55(1-2), 139-149.
Sullivan, J. H., Putnam, H. D., Keirn, M., Pruitt, B., & Nichols, J. (1979). A summary and evaluation of aquatic environmental data in relation to establishing water quality criteria for munitions-unique compounds. Part 3: White Phosphorus. In Final Report. Water and Air Research, Inc Gainesville, FL.
Tan, Z., & Reinhold-Hurek, B. (2003). Dechlorosoma suillum Achenbach et al. 2001 is a later subjective synonym of Azospira oryzae Reinhold-Hurek and Hurek 2000. International journal of systematic and evolutionary microbiology, 53(4), 1139-1142.
Tian, F., Hitchman, M. L., & Shamlian, S. H. (2012). Photocatalytic and photoelectrocatalytic degradation of the explosive RDX by TiO2 thin films prepared by CVD and anodic oxidation of Ti. Chemical Vapor Deposition, 18(4-6), 112-120.
Tsao, H. (2016). Process Comprising an ANAMOX Microorganism on a Biofilm Carrier for Removing Ammonium From a Wastewater Stream (JP Reference No. 5899373 B2). Japan Patent Office.
United States Office of Land and Emergency, Environmental Protection Agency Management, EPA, Federal Facilities Restoration and Reuse Office, Rao, U., Gao, U., & Murray, U. (2017). Technical Fact Sheet—Perchlorate. In EPA 505-F-17-003. https://ndep.nv.gov/uploads/env-sitecleanup-active-bmi-nert/epa-perchlorate-factsheet-nov2017.pdf.
United States Office of Solid Waste and EPA. (2014). Technical Fact sheet—Hexahydro-1,3,5-trinitro-1,3,5-triazine (RDX). https://19january2017snapshot.epa.gov/sites/production/files/2014-03/documents/ffrrofactsheet_contaminant_rdx_january2014_final.pdf.
Van Aken, B., Yoon, J. M., & Schnoor, J. L. (2004). Biodegradation of nitro-substituted explosives 2, 4, 6-trinitrotoluene, hexahydro-1, 3, 5-trinitro-1, 3, 5-triazine, and octahydro-1, 3, 5, 7-tetranitro-1, 3, 5-tetrazocine by a phytosymbiotic *Methylobacterium* sp. associated with poplar tissues (Populus deltoidesx nigra DN34). Applied and environmental microbiology, 70(1), 508-517.
Wilhelm, R. C., Niederberger, T. D., Greer, C., & Whyte, L. G. (2011). Microbial diversity of active layer and permafrost in an acidic wetland from the Canadian High Arctic. Canadian Journal of Microbiology, 57(4), 303-315.
Witte, T. (2015). Method for Producing Aqueous Colloidal Precious Metal Suspension (JP Reference No. 5791901 B2). Japan Patent Office.
Xiaolin, Y. (2016). Catalysts for Oxidation of Carbon Monoxie and/or Volatile Organic Compounds (CN Reference No. 105473221 A). China National Intellectual Property Administration.
Zhang, L., Wang, Y., Wei, L., Wang, Y., Shen, X., & Li, S. (2013). *Taibaiella smilacinae* gen. nov., sp. nov., an endophytic member of the family Chitinophagaceae isolated from the stem of Smilacina japonica, and emended description of Flavihumibacter petaseus. International journal of systematic and evolutionary microbiology, 63(Pt_10), 3769-3776.
Zhao, H. P., Ontiveros-Valencia, A., Tang, Y., Kim, B. O., Ilhan, Z. E., Krajmalnik-Brown, R., & Rittmann, B. (2013). Using a two-stage hydrogen-based membrane biofilm reactor (MBfR) to achieve complete perchlorate reduction in the presence of nitrate and sulfate. Environmental science & technology, 47(3), 1565-1572.
Zhou, C., Ontiveros-Valencia, A., Wang, Z., Maldonado, J., Zhao, H. P., Krajmalnik-Brown, R., & Rittmann, B. E. (2016). Palladium recovery in a H2-based membrane biofilm reactor: formation of Pd (0) nanoparticles through enzymatic and autocatalytic reductions. Environmental science & technology, 50(5), 2546-2555.
Zhou, C., Wang, Z., Ontiveros-Valencia, A., Long, M., Lai, C. Y., Zhao, H. P., . . . & Rittmann, B. E. (2017). Coupling of Pd nanoparticles and denitrifying biofilm promotes H2-based nitrate removal with greater selectivity towards N2. Applied Catalysis B: Environmental, 206, 461-470.

* cited by examiner

FIG. 2.
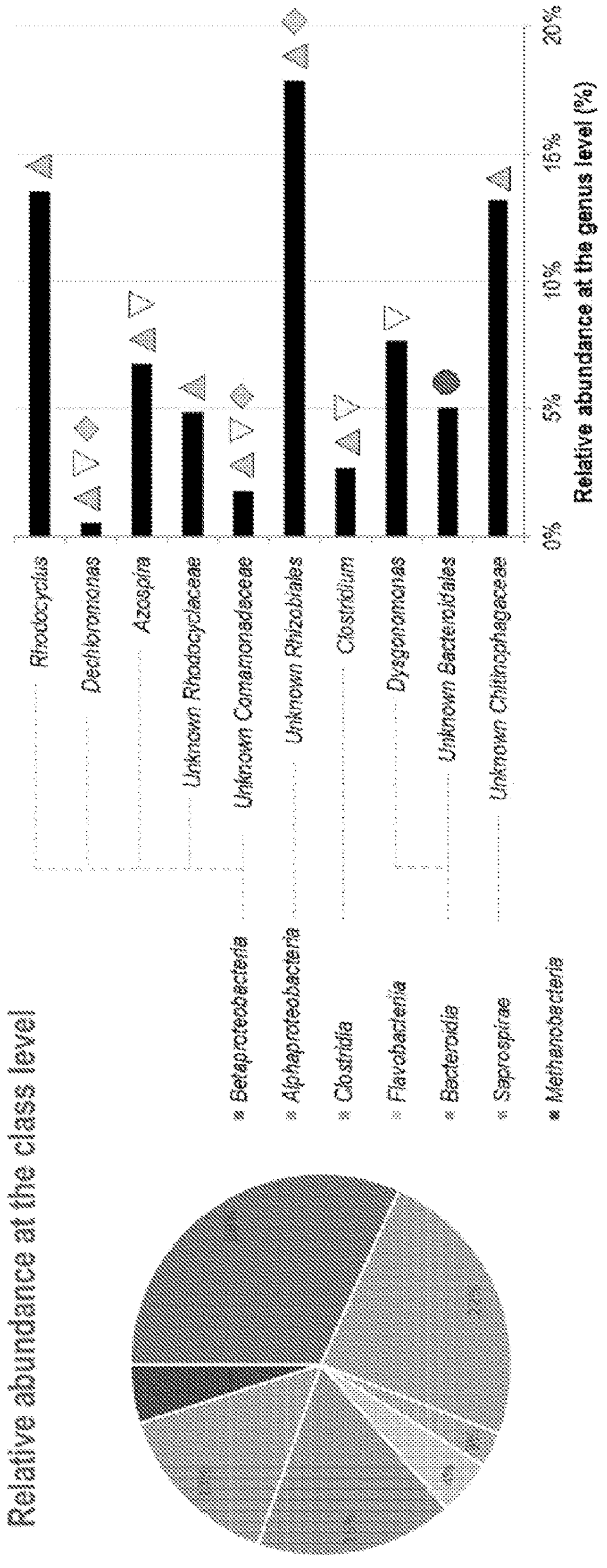
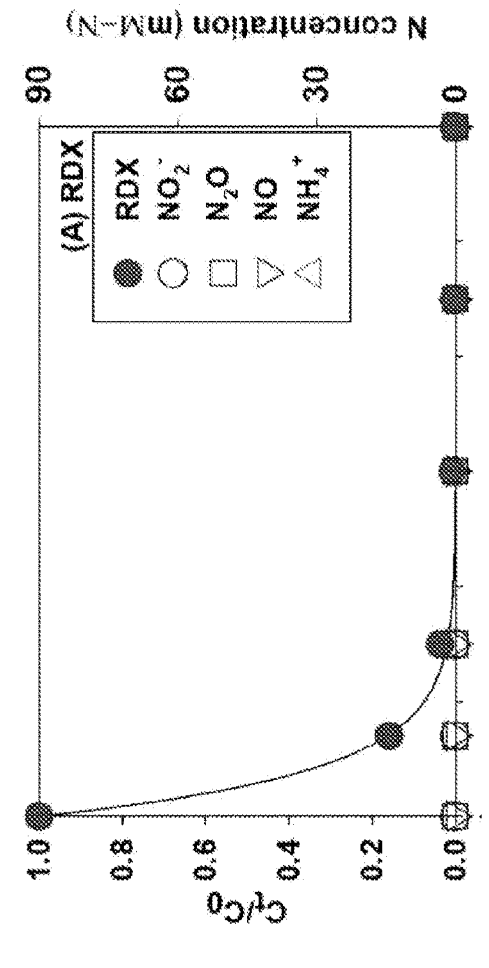
FIG. 3A

SYSTEMS FOR REMOVING EXPLOSIVES AND OTHER COEXISTING CONTAMINANTS FROM WATER AND RELATED METHODS

CROSS REFERENCE TO RELATED APPLICATIONS

This application claims the benefit of U.S. Provisional Patent Application No. 63/115,017, filed Nov. 17, 2020, and incorporates the disclosure of the provisional application by reference thereto.

FIELD OF THE INVENTION

The invention relates to systems and methods for removing explosives and other coexisting contaminants from water or wastewater.

BACKGROUND OF THE INVENTION

Ammunition, particularly legacy munitions and insensitive high explosives (IHE), generally contains a variety of nitrated organic compounds: nitroamines [$R_2N$—$NO_2$, such as 1,3,5-Trinitro-1,3,5-triazinane (RDX, or hexagon), 1,3,5,7-Tetranitro-1,3,5,7-tetrazoctane (HMX, or octogen), and hexanitrohexaazaisowurtzitane (HNIW, or CL-20)], nitroaromatics [R—$NO_2$, such as 2,4,6-trinitrotoluene (TNT), dinitrotoluenes (DNT), diazodinitrophenol (DDNP), and 2,4-dinitroanisole (DNAN)], and nitrate esters [R—O—$NO_2$; such as pentaerythritol tetranitrate (PETN), nitroglycerin (NG), and ethylene glycol dinitrate (EGDN)]. These energetics (also referred to herein as "explosive compounds") are widely used in a variety of munitions. For example, the Picatinny Arsenal Explosive 21 (PAX-21) is composed of RDX and 2,4-dinitroanisole (DNAN). Ammunition wastewater generally contains up to 200-500 mg/L RDX and HMX. Furthermore, these explosives have been introduced to soil and water around ammunition areas because of improper disposal of explosive-containing wastes. The explosives concentrations in the contaminated groundwater are in the thousands of micrograms per liter range.

These explosive compounds have adverse effects on a wide range of organisms, including algae, fish, and humans. For example, the Delaware Health and Social Services (DSS) reported that animal studies show HMX has adverse effects on the nervous system and liver. The United States Environmental Protection Agency (USEPA) has listed RDX, HMX, TNT, 2,4-DNT, and other nitrated explosives as priority pollutants. Additionally, the United States Environmental Protection Agency (EPA) risk assessments indicate that 0.3 μg/L and 30 μg/L RDX in drinking water concentration respectively represents a $10^{-6}$ and $10^{-4}$ cancer risk level. The recommended limit for the concentration of RDX in aqueous media is 300 μg/L, and a lifetime health advisory guidance level for RDX is 2 μg/L in drinking water. EPA also recommends that the concentration of HMX in an adult's drinking water be less than 0.4 mg/L.

Energetics usually occur in mixtures with oxyanions, such as $ClO^{4-}$, $NO^{3-}$, and $CrO_4^{2-}$, in ammunition wastewater and explosive-contaminated groundwater. Ammunition wastewater can contain about 190 mg/L (~2 mmol/L) $ClO_4^-$, as the explosives are often combined with perchlorate ($ClO_4^-$) to lower the sensitivity to the accidental explosion. $ClO_4^-$ in the form of ammonium perchlorate ($NH_4ClO_4^-$) is widely used as an oxidant and energetics booster in solid propellants for rockets, missiles, and fireworks. $ClO_4^-$ is known to have adverse effects on the thyroid gland and its hormones secretion by interfering with the uptake of iodide (National Research Council 2005). $ClO_4^-$ causes functional disruption of the thyroid and potentially leads to a reduction in the production of thyroid hormones, especially in infants and young children. The EPA has established an official reference Drinking Water Health Advisory of 15 μg/L and a tap-water screening level of 14 μg/L for perchlorate and its salts.

Munitions wastewater generally contains more than 100 mg/L $NO_3^-$ (>2 mmol/L). $NO_3^-$ is a public-health risk for causing cancer for the public and methemoglobinemia in infants below the age of six months. The maximum contaminant level (MCL) for $NO_3^-$ set by the EPA is 10 mg-N/L to protect against and methemoglobinemia in infants. The World Health Organization has given an admission level for many industrial or human uses as less than 50 mg/L $NO_3^-$, which is approximately 11 mg-N/L.

Multiple physical, chemical, and biological techniques have been applied for the treatment of ammunition wastewater, including adsorption using activated carbon, alkaline hydrolysis, photocatalysis, photoelectrocatalysis, electrochemical oxidation, Fenton oxidation, zero-valent iron (ZVI) reduction, Palladium (Pd) catalyzed reduction, microbial reduction, and phytoremediation. Most of these technologies, however, are not successful in practical application due to their limitation in 1) mineralizing the explosives (i.e., complete conversion of the explosives to $CO_2$ with minimal accumulation of harmful intermediates); 2) simultaneously removing all target contaminants (for examples, various explosives plus various oxyanions); and 3) minimizing energy cost caused by aeration and potential secondary contamination caused by adding organic carbon source. For example, none of the existing physiochemical approaches are able to convert the explosives completely to $CO_2$ or remove oxyanions. Among these physiochemical approaches, oxidation-based methods, such as photocatalysis, hydrolysis, and Fenton oxidation, cannot treat oxyanions. Biological methods are able to oxidize the explosives, but reaction rates are extremely slow.

Accordingly, systems and methods that can overcome such roadblocks are needed for the removal of ammunition-related contaminants in water or wastewater.

SUMMARY OF THE INVENTION

The disclosure relates to systems and methods for synthesizing bio-metal composite catalysts, also referred to herein as a metal-biofilm. Also described herein are system and methods for treating water and wastewater using the bio-metal composite catalyst to ammunition-related contaminants. The systems and methods described herein offers a cost-effective, efficient, reliable, and sustainable option that satisfactorily treats IHE and legacy ammunition constituents with bio-metal composite catalysts. The targeted contaminants include, but are not limited to, oxyanions (such as nitrate, nitrite, perchlorate, chlorate, chromate, and selenate), explosives (such as RDX, HMX, CL-20, TNAZ, TNT, DNT, DNP, DDNP, DNB, DUNNITE, DNAN, TATB, PETN, NG, and EGDN), and other miscellaneous organic contaminants (such as trichloroethane (TCA), trichloroethene (TCE), and other halogenated compounds).

The technology also enables one-pot simultaneous removal of explosives and oxyanions, which solely physical-chemical or biological treatment technologies cannot accomplish on their own.

The system for establishing a metal-biofilm for removing ammunition-related contaminants comprise a gas-transfer membrane, a hydrogen-gas source, an inoculant comprising a biofilm-forming population of microorganisms, a growth medium comprising at least one nitrate salt and at least one perchlorate salt, and a catalyst precursor medium comprising at least one soluble autocatalytic metal precursor and having a basic pH. The growth medium feeds biofilm-forming population of microorganisms to establish a biofilm anchored on the gas-transfer membrane. The catalyst precursor medium feeds the biofilm, whereby the biofilm converts the soluble autocatalytic metal precursor to autocatalytic metal nanoparticles. The resulting autocatalytic metal nanoparticles are embedded in the biofilm matrices to produce a metal-biofilm that is anchored on the gas-transfer membrane.

Also described is a system for removing ammunitions contaminants from a fluid comprises a gas-transfer membrane, a hydrogen-gas source, autocatalytic metal nanoparticles; and a biofilm, wherein the autocatalytic metal nanoparticles are embedded in the matrices of the biofilm. The biofilm comprises a $H_2$-utilizing autotroph capable of reducing oxyanions, a $H_2$-utilizing autotroph capable of reducing precious metals, and a heterotroph capable of degrading organics.

Methods of establishing a bio-metal composite catalyst for removing ammunition-related contaminants are disclosed. In one embodiment, the method comprises providing an aqueous system, wherein the aqueous system comprises a gas-transfer membrane and a hydrogen-gas source and inoculating the gas-transfer membrane with an inoculant to establish a biofilm anchored to the gas-transfer membrane. The inoculated aqueous system is provided with a growth medium comprising at least one nitrate salt and at least one perchlorate salt to establishes a biofilm on the gas-transfer membrane. The method further comprises providing the aqueous system with a catalyst precursor medium comprising at least one soluble autocatalytic metal precursor and having a basic pH. The catalyst precursor medium feeds the biofilm, and the biofilm converts the soluble autocatalytic metal precursor to autocatalytic metal nanoparticles, which are embedded in the biofilm matrices to produce a metal-biofilm that is anchored on the gas-transfer membrane.

In another embodiment, the method for establishing a bio-metal composite catalyst for removing ammunition-related contaminants comprises providing an aqueous system, wherein the aqueous system comprises a gas-transfer membrane; a biofilm, wherein the biofilm is anchored to the gas-transfer membrane and comprises a $H_2$-utilizing autotroph capable of reducing oxyanions, a $H_2$-utilizing autotroph capable of reducing precious metals, and a heterotroph capable of degrading organics; and a hydrogen-gas source. The method further comprises providing the aqueous system with a catalyst precursor medium comprising at least one soluble autocatalytic metal precursor and having a basic pH. The catalyst precursor medium feeds the biofilm, and the biofilm converts the soluble autocatalytic metal precursor to autocatalytic metal nanoparticles, which are embedded in the biofilm matrices to produce a metal-biofilm that is anchored on the gas-transfer membrane.

Methods of removing ammunition-related contaminants in a fluid are also disclosed. In one embodiment, the method comprises providing an aqueous system, wherein the aqueous system comprises a gas-transfer membrane and a hydrogen-gas source; and inoculating the gas-transfer membrane with an inoculant to establish a biofilm anchored to the gas-transfer membrane. The method further comprises providing the inoculated aqueous system with a growth medium comprising at least one nitrate salt and at least one perchlorate salt, wherein growth medium establishes a biofilm on the gas-transfer membrane; and providing to the metal-biofilm the fluid with ammunition-related contaminants, wherein the metal-biofilm reduces the ammunition-related contaminants. In some aspects, the pH of the fluid with ammunition-related contaminants is a neutral pH. In other aspects, the method further comprises adjusting the pH of the fluid with ammunition-related contaminants to a neutral pH.

In another embodiment, the method comprises providing an aqueous system comprising a gas-transfer membrane, a hydrogen-gas source, and a bio-metal composite catalyst and providing to the aqueous system the fluid with ammunition-related contaminants, wherein the bio-metal composite catalyst reduces the ammunition-related contaminants. The bio-metal composite catalyst comprises autocatalytic metal nanoparticles embedded in the matrices of a biofilm. The biofilm is anchored to the gas-transfer membrane, and the biofilm comprises a $H_2$-utilizing autotroph capable of reducing oxyanions, a $H_2$-utilizing autotroph capable of reducing precious metals, and a heterotroph capable of degrading organics. In some aspects, the pH of the fluid with ammunition-related contaminants is a neutral pH. In other aspects, the method further comprises adjusting the pH of the fluid with ammunition-related contaminants to a neutral pH.

For the above-described methods and systems, the inoculant comprises a biofilm-forming population of microorganisms comprising a $H_2$-utilizing autotroph capable of reducing oxyanions, a $H_2$-utilizing autotroph capable of reducing precious metals, and a heterotroph capable of degrading organics. In some aspects, the inoculant comprises bacteria from the classes Betaproteobacteria, Alphaproteobacteria, and Saprospirae. In some embodiments, the inoculant comprises bacteria from at least one class selected from the group consisting of: Clostridia, Flavobacteria, Bacteroidia, and Methanobacteria. In other aspects, the inoculant comprises a member from *Rhodocyclus, Rhizobiales*, and *Chitinophagaceae*. In some embodiments, the inoculant comprises a member of *Azospira, Rhodocyclaceae, Dysgonomonas*, and *Bacteroidales*.

In some aspects of the above-described methods and systems, the concentration of the at least one soluble autocatalytic metal precursor in the catalyst precursor medium is 0.1-5 mM. In certain embodiments, the least one soluble autocatalytic metal precursor of the catalyst precursor membrane is selected from platinum group metals. For example, the autocatalytic metal nanoparticles are nanoparticles of elemental palladium ($Pd^0$). In particular embodiments, the concentration of platinum group metal in the catalyst precursor medium is 2 mM.

In some aspects of the above-described methods and systems, the at least one nitrate salt in the growth medium provide a concentration of nitrate of at least 14 mg-N/L and the at least one perchlorate salt provides a concentration of $ClO_4^-$ of at least 10 mg/L. for example, the at least one nitrate salt in the growth medium provides a concentration of nitrate of 14-48 mg-N/L and the at least one perchlorate salt provides a concentration of $ClO_4^-$ of 10-200 mg/L. In particular embodiments, the growth medium comprises 300-350 mg/L $NaNO_3$ and 240-245 mg/L $NaClO_4$.

In some aspects of the above-described methods and systems, the hydrogen-gas source provides $H_2$ gas mixed with $CO_2$ gas at a mole ratio of 99:1 to 1:99. In some embodiments, the hydrogen-gas source provides $H_2$ gas mixed with $CO_2$ gas at a mole ratio of 95:5 to 50:50.

BRIEF DESCRIPTION OF THE DRAWINGS

FIG. 2 depicts, in accordance with certain embodiments, the phylogenetic composition of the biofilm at class and genus levels of the bio-metal composite catalyst for reducing ammunition-related contaminants. The analysis was performed after the bio-metal composite catalysts has been exposed to ammunitions-related contaminants for a month. At the genus level, upward pointing triangle symbols refer to denitrifying microorganisms; downward pointing triangles refer to perchlorate-reducing microorganisms; diamonds refer to metal-reducing microorganisms potentially responsible for Pd(II) reduction of $Pd^0$; and circles refer to fermenters that may be responsible for mineralization of RDX intermediates.

FIGS. 3A-3D depict, in accordance with certain embodiments, the removal of 10 mg/L RDX, TNT, and PETN separately (FIGS. 3A-3C) and simultaneously (FIG. 3D) catalyzed by Pd-biofilm.

DETAILED DESCRIPTION OF THE INVENTION

Figure 1:
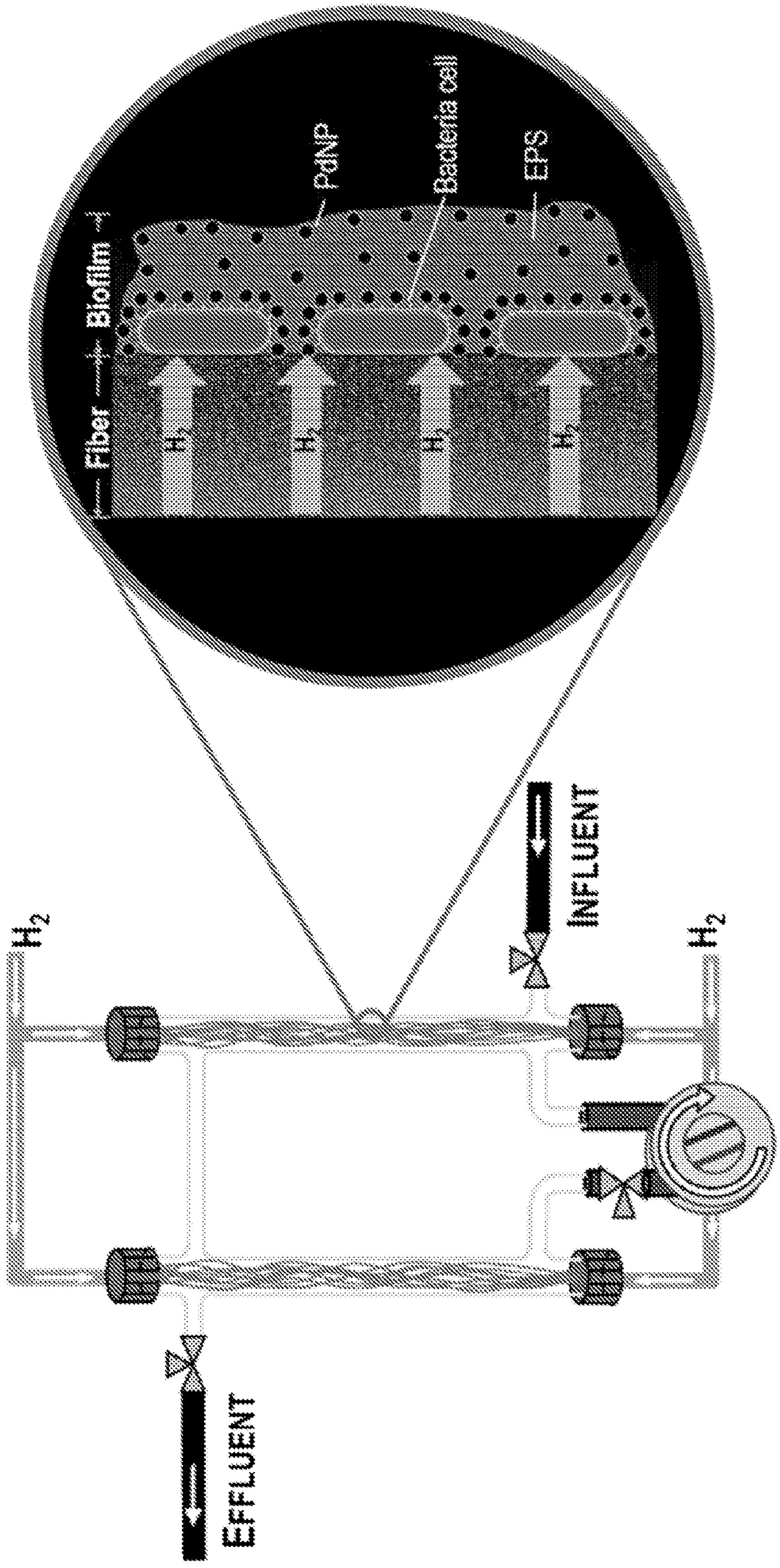
FIG. 1 illustrates, in accordance with certain embodiments, a schematic of a bench-scale form of the reactor.

Detailed aspects and applications of the invention are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth to provide a thorough understanding of the various aspects of the invention. It will be understood, however, by those skilled in the relevant arts, that the present invention may be practiced without these specific details. It should be noted that there are many different and alternative configurations, devices, and technologies to which the disclosed inventions may be applied. The full scope of the inventions is not limited to the examples that are described below.

The singular forms "a," "an," and "the" include plural referents unless the context clearly dictates otherwise. Thus, for example, reference to "a step" includes reference to one or more of such steps.

As used herein, the term "explosives", "explosive contaminants", or "ammunitions-related contaminants" include 1,3,5-Trinitro-1,3,5-triazinane (RDX or hexagon), 1,3,5,7-Tetranitro-1,3,5,7-tetrazoctane (HMX or octogen), 2,4,6-trinitrotoluene (TNT), dinitrotoluenes (DNT), hexanitrohexaazaisowurtzitane (HNIW or CL-20), 2,4-dinitroanisole (DNAN), pentaerythritol tetranitrate (PETN), nitroglycerin (NG), 2,4-dinitrophenol (DNP), diazodinitrophenol (DDNP), 1,3-dinitrobenzene (DNB), ethylene glycol dinitrate (EGDN), triaminotrinitrobenzene (TATB), 1,3,3-trinitroazetidine (TNAZ), dunnite.

Disclosed herein are cost-effective, efficient, reliable, and sustainable methods of removing ammunitions-related contaminants from a liquid that satisfactorily treats insensitive high explosives (IHE) and legacy ammunition constituents with bio-metal composite catalysts. The targeted contaminants include, but are not limited to, oxyanions (such as nitrate, nitrite, perchlorate, chlorate, chromate, and selenate), explosives (such as RDX, HMX, CL-20, TNAZ, TNT, DNT, DNP, DDNP, DNB, dunnite, DNAN, TATB, PETN, NG, and EGDN), and other miscellaneous organic contaminants (such as TCA, TCE, and halogenated compounds). In some aspects, the fluid containing the contaminants is water or wastewater. Accordingly, also described are systems for treating water and wastewater using the bio-metal composite catalyst to remove ammunition-related contaminants. The methods and systems catalytically convert the explosives into less harm and more biodegradable intermediates. In some aspects, the methods and systems also biologically mineralize the intermediates into $CO_2$ and converting the co-existing oxyanions into harmless forms. Unlike solely physical-chemical or biological treatment technologies, the described methods and systems enable one-pot simultaneous removal of explosives and oxyanions. The disclosure also describes system and methods for synthesizing bio-metal composite catalysts, referred to herein as a metal-biofilm. The disclosure is also directed to the metal-biofilm.

Compared to other physical-chemical treatment technologies such as advanced oxidation and photocatalysis processes, the methods and systems disclosed herein are capable of simultaneously removing in a single module organic explosives and inorganic oxyanions that co-exist in ammunition-contaminated water and ammunition wastewater. Additionally, the only reagent that needs to be continuously supplied is hydrogen gas ($H_2$), which is inexpensive, nontoxic and can be generated on-site and on-demand. No input of energy-consumable or environmental-unfriendly reagents, such as UV light, ozone, hydrogen peroxide, or peroxysulfates, are required. Thus, the methods and systems described herein provide substantial saving of energy and cost in catalyst synthesis compared to conventional abiotic synthesis approaches with high energy input yet low catalyst yield.

Table 1 summarizes the improvements of described methods and systems over the existing technologies for removing ammunition-related contaminants.

TABLE 1

Comparison of ammunition-related contaminant removal technologies

| Method | Explosive Rapid Removal | Explosive Decomposition | Explosive Mineralization | Oxyanion Removal | Secondary Contamination | Energy Input | One-Pot solution |
|---|---|---|---|---|---|---|---|
| Adsorption | X | | | | Yes | Low | |
| Hydrolysis | X | X | | | Yes | Low | |
| Pyrolysis | X | X | X | | No | High | |
| Photosynthesis | X | X | | | Yes | High | |
| Advanced Oxidation | X | X | | | Yes | High | |
| Biological (aerobic) | | X | X | | No | Low | |
| Biological (anaerobic) | | X | X | X | Yes | Low | X |
| Disclosed Method | X | X | X | X | No | Low | X |

The method for removing ammunition-related contaminants comprises establishing a metal-biofilm and thus for synthesizing bio-metal composite catalysts. To establish the metal-biofilm, a biofilm must first be established. Accordingly, the method utilizes a system comprising a gas-transfer membrane and a hydrogen-gas source. The system is provided with an inoculant comprising a biofilm-forming population of microorganisms and a growth medium so that the gas-transfer membrane is submerged with a solution containing the growth medium and the inoculant. The method further comprises feeding the inoculated system with the growth medium, wherein a biofilm is formed on the gas-transfer membrane from the inoculant. In some implementations, the inoculated system is fed with the growth medium at a hydraulic retention time (HRT) of 0.1-48 hours, preferably between 4 and 20 hours. In some preferred embodiments, the system was continuously fed with the growth medium for 2 to 8 weeks to ensure a robust biofilm is formed on the gas-transfer membrane.

Once the biofilm is formed, the system is provided with a catalyst precursor medium so that the gas-transfer membrane coated with the biofilm is submerged in the catalyst precursor medium. Feeding the system with the catalyst precursor medium results in the conversion of soluble autocatalytic metal precursors to autocatalytic metal nanoparticles, which are embedded into the biofilm matrices and serve as the catalyst for contaminant removal reactions. The resulting bio-metal composite catalyst film ("metal-biofilm") on the membrane surfaces can treat explosive-contaminated water and wastewater. In some embodiments, the biofilm is in directly contacted with the catalyst precursor medium for 0.5-24 hours, preferably between 2-10 hours, to form the metal-biofilm. In a particular embodiment, the catalyst precursor medium comprises palladium (Pd(II)), for example, in the form of $Na_2PdCl_4$. In some aspects, the concentration of palladium in the catalyst precursor medium is 2 mM, and the pH of the palladium-containing catalyst precursor medium is around 9. In such embodiments, soluble Pd(II) was immobilized into the biofilm via adsorption, and the adsorbed Pd(II) was reduced to $Pd^0$ nanoparticles. The $Pd^0$ nanoparticles are embedded in the biofilm matrices. In certain embodiments, the $Pd^0$ nanoparticles are 2-5 nm in major dimension, which provides high reaction area.

In view of the above, the system for establishing a metal-biofilm, which could be used to remove ammunition-related contaminants, comprises a gas-transfer membrane, a hydrogen-gas source, an inoculant comprising a biofilm-forming population of microorganisms, a growth medium, and a catalyst precursor medium. Accordingly, a system for removing ammunitions-related contaminants from a fluid comprises a metal-biofilm, a gas-transfer membrane, and a hydrogen-gas source. The meta-biofilm is anchored on the liquid-phase of the gas-transfer membrane, while the hydrogen-gas source provides $H_2$ to the gas-phase of the gas-transfer membrane.

The methods for removing ammunition-related contaminants from a fluid further comprise providing a fluid comprising ammunition-related contaminants to the metal-biofilm, where the metal-biofilm reduces the ammunition-related contaminant. Thus, the systems for removing ammunition-related contaminants from water or wastewater comprise a gas-transfer membrane, a hydrogen-gas source, autocatalytic metal nanoparticles, and a biofilm, where the autocatalytic metal nanoparticles are embedded in the matrices of the biofilm. The running conditions for the method of removing ammunition-related contaminants from a fluid and the disclosed system may be optimized by adjusting the partial pressure of $H_2$ provided to the metal-biofilm by the hydrogen-gas source and the HRT of system in relation to the concentration of the contaminants in the fluid, in particular the ammunition-related contaminants. For example, the higher contaminants concentration in the fluid, the higher the partial pressure of $H_2$ or the longer HRT will be needed. In certain implementations the pH of the fluid is buffered to be around neutral pH to ensure the biofilm of the metal-biofilm is operating in an optimized environment.

a. Gas-Transfer Membrane

The gas-transfer membrane does not have pores in its wall (e.g., a nonporous membrane). The lack of pores in the membrane enables transferring gas (e.g., hydrogen or oxygen) in a bubble-free form at controllable rates. In some embodiments, the membrane is a hollow-fiber membrane. In such embodiments, gas is supplied to the lumen of the hollow-fiber membrane (the gas-phase side). Accordingly, the biofilm and autocatalytic metal nanoparticles would be anchored to the outer surface of the hollow-fiber membrane (the liquid-phase side). In other embodiments, the membrane is a flat- or curled-sheet membrane. In such embodiments, $H_2$ is supplied to one side of the sheet membrane (the gas-phase side), while biofilm and autocatalytic metal nanoparticles are anchored to the other surface of the sheet membrane (the liquid-phase side).

The membrane may be made of a variety of polymeric materials, for example polypropylene, polyurethane, polysulfone, or composite forms. In some embodiments, the membrane comprises polypropylene fibers and has a permeability of $1.8\times10^7$ $m^3$ $H_2$•m membrane thickness/$m^2$ hollow fiber surface area•d•bar at standard temperature and pressure. In some aspects, the membrane of the system is nonporous, for example, the membrane lacks pores in its walls. In some embodiments, the outer diameter of the hollow fiber membrane is about 200 μm; the inner diameter of the hollow fiber membrane is about 100-110 μm; and the wall thickness of the hollow fiber membrane is about 50-55 μm.

In particular embodiments, the gas-transfer membrane is a nonporous polypropylene hollow-fiber membrane (200 μm OD, 100-110 μm ID, wall thickness 50-55 μm).

b. Hydrogen-Gas Source

The hydrogen-gas source can be any reliable source of $H_2$ gas, for examples, a gas storage tank having pressurized $H_2$ gas, a $H_2$ generator via water electrolysis, or a methane reformer. In other embodiments, the hydrogen-gas source include a built-in or external gas pressure regulator. The gas pressure regulator regulates the pressure of $H_2$ gas from the gas storage tank to the gas-phase side of the membrane. In certain preferred embodiments, $H_2$ gas is mixed with $CO_2$ gas to balance pH and provide autotrophs in the biofilm with inorganic carbon sources. The $H_2$ to $CO_2$ mole ratio is set at a certain value in a range from 99:1 to 1:99. In some embodiments, $H_2$ and $CO_2$ are premixed at a certain mole ratio in a range of 95:5 to 50:50.

The hydrogen-gas source supplies the gas at between 18.0-28.0 psi, preferably between 19.0-28.0 psi, between 20.0-28.0 psi, between 19.0-24.0 psi, between 20.0-24.0 psi, between 20.0-23.0 psi, between 19.0-20.0 psi, between 18.0-20.0 psi, between 20.0-21.0 psi, between 21.0-22.0 psi, between 22.0-23.0 psi, between 23.0-24.0 psi, between 24.0-25.0 psi, between 25.0-26.0 psi, between 26.0-27.0 psi, between 27.0-28.0 psi, about 19.8 psi, about 21.8 psi, about 23.0 psi, about 23.8 psi, or about 27.2 psi.

c. Inoculant and the Biofilm

The inoculant comprising a biofilm-forming population of microorganisms enables the formation of a biofilm that is anchored to the gas-transfer membrane. The biofilm-forming population of microorganisms comprises $H_2$-utilizing autotrophs capable of reducing oxyanions, $H_2$-utilizing autotrophs capable of reducing precious metals, and heterotrophs capable of degrading organics. For example, the biofilm-forming population of microorganisms comprises bacteria from the classes Betaproteobacteria, Alphaproteobacteria, and Saprospirae. In some embodiments, the biofilm-forming population of microorganisms further comprises bacteria from at least one class selected from the group consisting of: Clostridia, Flavobacteria, Bacteroidia, and Methanobacteria. In some implementations, the biofilm-forming population of microorganisms comprises *Rhodocyclus, Rhizobiales*, and *Chitinophagaceae*. In some aspects, the biofilm-forming population of microorganisms further comprises *Azospira, Rhodocyclaceae, Dysgonomonas*, and *Bacteroidales*.

Accordingly, the biofilm comprises bacteria from the classes Betaproteobacteria, Alphaproteobacteria, and Saprospirae. In some embodiments, the biofilm further comprises bacteria from at least one class selected from the group consisting of: Clostridia, Flavobacteria, Bacteroidia, and Methanobacteria. In some implementations, the biofilm comprises *Rhodocyclus, Rhizobiales*, and *Chitinophagaceae*. In some aspects, the biofilm further comprises *Azospira, Rhodocyclaceae, Dysgonomonas*, and *Bacteroidales.* d. Growth Medium

The growth medium stimulates sufficient microbial growth to establish and/or maintain the biofilm. The growth medium comprises at least one type of nitrate salts (for example, sodium nitrate) and salts of one or multiple other oxyanions (for example, sodium perchlorate and sodium chromate). The growth medium comprises high concentrations of the nitrate sand the oxyanion. In some aspects, the concentration of nitrate salt is 10-60 mg-N/L (44-266 mg/L $NO_3^-$), and the concentration of the oxyanion is 10-300 mg/L. For example, the concentration of nitrate salt is 10-55 mg-N/L, 10-50 mg-N/L, 10-49 mg-N/L, 10-48 mg-N/L, 10-47 mg-N/L, 10-46 mg-N/L, 10-45 mg-N/L, 14-60 mg-N/L, 14-55 mg-N/L, 14-50 mg-N/L, 14-49 mg-N/L, 14-48 mg-N/L, 14-47 mg-N/L, 14-46 mg-N/L, 14-45 mg-N/L, 18-60 mg-N/L, 18-55 mg-N/L, 18-50 mg-N/L, 18-49 mg-N/L, 18-48 mg-N/L, 18-47 mg-N/L, 18-46 mg-N/L, or 18-45 mg-N/L. The concentration of the oxyanion is, for example, 10-250 mg/L, 10-225 mg/L, 10-200 mg/L, 10-175 mg/L, 10-150 mg/L, 15-250 mg/L, 15-225 mg/L, 15-200 mg/L, 15-175 mg/L, 15-150 mg/L, 20-250 mg/l, 20-225 mg/l, 20-200 mg/L, 20-175 mg/l, or 20-150 mg/L.

In certain preferred aspects, the growth medium comprises salts of a full spectrum of macronutrients, such as calcium (Ca), magnesium (Mg), phosphorus (P), sodium (Na), potassium (K), and iron (Fe). In the preferred aspects, the growth medium also comprises salts of a full spectrum of micronutrients, such as zinc (Zn), manganese (Mn), boron (B), cobalt (Co), copper (Cu), nickel (Ni), molybdenum (Mo), and selenium (Se). In other preferred embodiments, the growth medium comprises mixed phosphate salts (for example, $H_3PO_4$, $NaH_2PO_4$, $Na_2HPO_4$, and $Na_3PO_4$) as pH buffers. In a particular embodiment, the growth medium comprises $NaNO_3$, $NaClO_4$, $Na_2HPO_4$, $NaH_2PO_4$, $Ca(NO_3)_2$, $Mg(NO_3)_2$, $ZnSO_4$, $MnCl_2$, $H_3BO_3$, $CoCl_2$, $CuCl_2$, $NiCl_2$, $Na_2MoO_4$, and $Na_2SeO_3$.

In a particular embodiment, the concentration of $NO_3^-$ in the growth medium is 14-48 mg-N/L, and the concentration of $ClO_4^-$ in the growth medium is between 10~200 mg/L. For example, the growth medium contains 340 mg/L $NaNO_3$, 244.8 mg/L $NaClO_4$, 994 mg/L $Na_2HPO_4$, 840 mg/L $NaH_2PO_4$, 1.66 mg/L $Ca(NO_3)_2$, 1.48 mg/L $Mg(NO_3)_2$, 0.1 mg/L $ZnSO_4 \cdot 7H_2O$, 0.03 mg/L $MnCl_2 \cdot 4H_2O$, 0.3 mg/L $H_3BO_3$, 0.2 mg/L $CoCl_2 \cdot 6H_2O$, 0.01 mg/L $CuCl_2 \cdot 2H_2O$, 0.01 mg/L $NiCl_2 \cdot 6H_2O$, 0.03 mg/L $Na_2MoO_4 \cdot 2H_2O$, and 0.03 mg/L $Na_2SeO_3$.

e. Catalyst Precursor Medium

The catalyst precursor medium comprises at least one autocatalytic metal precursors and a solvent. In some embodiments, the solvent is water, for example, deionized water. Autocatalytic metal precursors include, but are not limited to, gold (Au), silver (Ag), platinum (Pt), palladium (Pd), ruthenium (Ru), rhodium (Rh), osmium (Os), and iridium (Ir). In particular embodiments, the at least one autocatalytic metal precursor is selected from a metal in the platinum group metals. In some aspects, the autocatalytic metal precursors are chemicals that rapidly dissolve in the solvent and release soluble autocatalytic metal ions (for example, $Ru^{3+}$ released from ruthenium chloride ($RuCl_3$)) or soluble autocatalytic metal complexes of various ligands (for example, $(PdCl_4)^{2+}$ released from sodium tetrachloropalladate ($Na_2PdCl_4$)). The concentration of autocatalytic metal precursors in the catalyst precursor medium is between 0.01 mM and 100 mM. In certain preferred embodiments, the concentration of autocatalytic metal precursors in the catalyst precursor medium is 0.1-5 mM.

In particular embodiments, the catalyst precursor medium has a pH of between 4 and 10, for example, between 6 and 8. Accordingly, the autocatalytic metal medium may further comprise an acid (for example, hydrochloric acid), a base (for example, sodium hydroxide), and/or a pH buffer (for example, potassium phosphate species) to adjust the pH to a desired range.

Culturing the biofilm with the catalyst precursor medium converts the biofilm into a metal-biofilm that can remove explosives and oxyanions from a fluid with ammunition-related contaminants. The metal-biofilm is the biofilm with nanoparticles of the at least one autocatalytic metal immobilized within. The nanoparticles of the at least one autocatalytic metal is formed from the biofilm reducing the at least one autocatalytic metal precursor in the catalyst precursor medium. For example, in some implementations where the catalyst precursor medium comprises 2 mM palladium in the form of $Na_2PdCl_4$, soluble Pd(II) is immobilized into the biofilm via adsorption. The adsorbed Pd(II) is then reduced to $Pd^0$ nanoparticles, which are retained on the microbial cell surfaces and extracellular polymeric substances (EPS) of the biofilm. The resulting biofilm containing $Pd^0$ functions as the bio-metal composite catalyst.

Illustrative, Non-Limiting Examples in Accordance with Certain Embodiments

The disclosure is further illustrated by the following examples that should not be construed as limiting. The contents of all references, patents, and published patent applications cited throughout this application, as well as the Figures, are incorporated herein by reference in their entirety for all purposes.

1. Synthesis of Bio-Metal Composite Catalyst: an Example of Forming Pd-Biofilm on $H_2$-Delivering Membrane A bench-scale MPfR featuring bio-metal composite films was established in ambient conditions (23° C. and 1 atm). The system has a dual-tube design as shown in FIG. 1. The system has a total working volume of 75 ml and contains a main bundle with 50 hollow-fiber membranes (nonporous gas-transfer membrane, 280 μm OD, 180 μm ID, wall thickness 50 μm) as well as a "coupon" bundle with 10 same fibers in two glass tube, respectively. The length of each fiber is 18 cm long, which results in total membrane surface of 92.4 $cm^2$. Premixed gas (80% $H_2$/20% $CO_2$) was supplied to all the ends of fiber bundles at varying pressures controlled by a pressure regulator. A solute's concentration inside the reactor was kept equal to its effluent concentration due to mixing by a recirculating pump at a rate of 150 ml/min.

The system was first inoculated with anoxic sludge from a local wastewater reclamation plant, and then it was filled with the growth medium containing 340 mg/L $NaNO_3$, 244.8 mg/L $NaClO_4$, 994 mg/L $Na_2HPO_4$, 840 mg/L $NaH_2PO_4$, 1.66 mg/L $Ca(NO_3)_2$, 1.48 mg/L $Mg(NO_3)_2$, 0.1 mg/L $ZnSO_4 \cdot 7H_2O$, 0.03 mg/L $MnCl_2 \cdot 4H_2O$, 0.3 mg/L $H_3BO_3$, 0.2 mg/L $CoCl_2 \cdot 6H_2O$, 0.01 mg/L $CuCl_2 \cdot H_2O$, 0.01 mg/L $NiCl_2 \cdot 6H_2O$, 0.03 mg/L $Na_2MoO_4 \cdot 2H_2O$, and 0.03 mg/L $Na_2SeO_3$. The system was left in batch mode overnight and then continuously fed with the growth medium for three months. Thick, mature biofilms had formed on the membrane surfaces after three months.

Denitrifying microorganisms had the dominant presence in the biofilm (FIG. 2). A large majority of sequences belonged to class β-proteobacteria (28%), α-proteobacteria (22%), and Bacteroidia (15%). The Rhodocyclaceae family was the most abundant group (26% of the total community), with sequences mainly clustering into the denitrifying genera *Rhodocyclus, Azospira, Dechloromonas*, and an unknown genus. The *Rhodocyclus* spp. (14%) have been reported to be well adapted for autotrophic nitrate removal using hydrogen as the electron donor. *Dechloromonas* (1%) have repeatedly been used in $H_2$-fed biofilms for denitrification. The other two dominant family groups, an unknown Rhizobiales family (22%) and *Chitinophagaceae* (13%), also have been identified as denitrifiers. The total abundance of these identified denitrifying genera was 61% in the biofilm.

Perchlorates are usually utilized co-metabolically by denitrifiers, such as *Dechloromonas, Azospira*, and *Clostridium* spp. that are abundant in the biofilm. In addition, some non-denitrifying microorganisms like *Dysgonomonas* spp. in the biofilm are found capable of perchlorate reduction. The total abundance of these identified perchlorate-reducing genera was 19% in the biofilm.

The *Dechloromonas* genus have potential ability to respire other metals and previous study verified that it was a leading palladium-reducer in a $H_2$-fed biofilm. The family Comamonadaceae (3%) and the order Rhizobiales (22%) are abundant in natural acidic environments contaminated by heavy metals [42, 43]. In addition, they were found to be enriched after exposure to precious metals and probably responsible for precious metal reduction. These groups, totally consisting of 25% of the biofilm, are potentially responsible for palladium catalyst synthesis and stabilization during the following stage of synthesizing bio-metal composite catalysts.

*Bacteroidales* (15%) are well reported anaerobic fermenters, and they likely survived in the biofilm by consuming byproducts from microbial metabolism. They are potential contributors to explosive mineralization via complete breakdown of the intermediates to $CO_2$.

Once the biofilm matures, the bio-metal composite catalyst (also referred to herein as the metal-biofilm) could be synthesized. To form the bio-metal composite catalyst, a catalyst precursor medium was added into the system so that the biofilm would be fully immersed in the catalyst precursor medium. The catalyst precursor medium contains 2 mM palladium in the form of $Na_2PdCl_4$. The medium pH was set at around 9 using phosphate buffer. Soluble Pd(II) was immobilized into the biofilm via adsorption, and the adsorbed Pd(II) was reduced to $Pd^0$ nanoparticles. The $Pd^0$ nanoparticles are retained on the microbial cell surfaces and extracellular polymeric substances (EPS) of the biofilm. After 12 hours, over 99% of the Pd(II) was converted to nanoparticulate $Pd^0$ stabilized in the biofilm matrix. The resulting biofilm containing $Pd^0$ is subsequently referred to herein as Pd-biofilm, which functions as the bio-metal composite catalyst.

2. Explosive Removal by Bio-Metal Composite Catalyst: An Example of RDX, TNT, and PETN Decomposition by the Pd-Biofilm A series of batch tests were conducted to profile destruction of RDX, TNT, and PETN catalyzed by the Pd-biofilm.

All the batch tests were conducted at pH of 7 and 25° C. in anaerobic conditions. The $H_2$ pressure was set constantly at 20 psig (2.36 atm).

FIG. 3A presents the change in RDX concentration over time after the RDX solution was introduced into the system featuring Pd-biofilm. 10 mg/L of RDX was substantially removed to below 300 ug/L (the EPA recommended limit in aqueous media) within 45 minutes. This yields a pseudo-first-order rate of 15.5 $hr^{-1}$ or a catalytic activity of 0.07 $L \cdot mg\text{-}Pd^{-1} \cdot hr^{-1}$. Along with the decomposition was transient accumulation of $NO_2^-$ up to only 0.04 mg/L (2% of the total =N—$NO_2$ groups in the RDX) followed by gradual depletion within the next 10 minutes. These results confirm that 1) the Pd-biofilm was able to cleave from the N—$NO_2$ bond in RDX the nitro group (—$NO_2^-$) that consequently was released as free nitrite ions ($NO_2^-$); and 2) the Pd-biofilm further removed the released $NO_2^-$ via reduction mostly to $N_2$, as reported before.

Figure 3B:
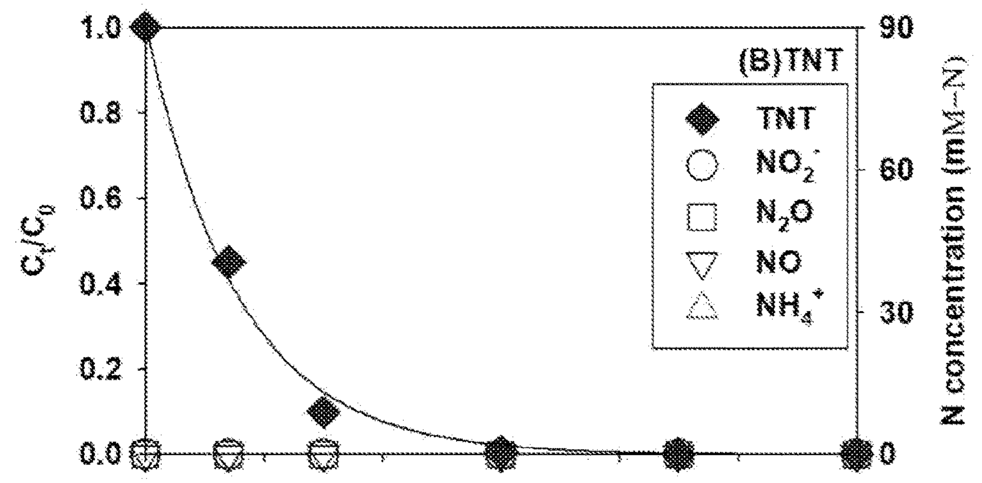
Figure 3C:
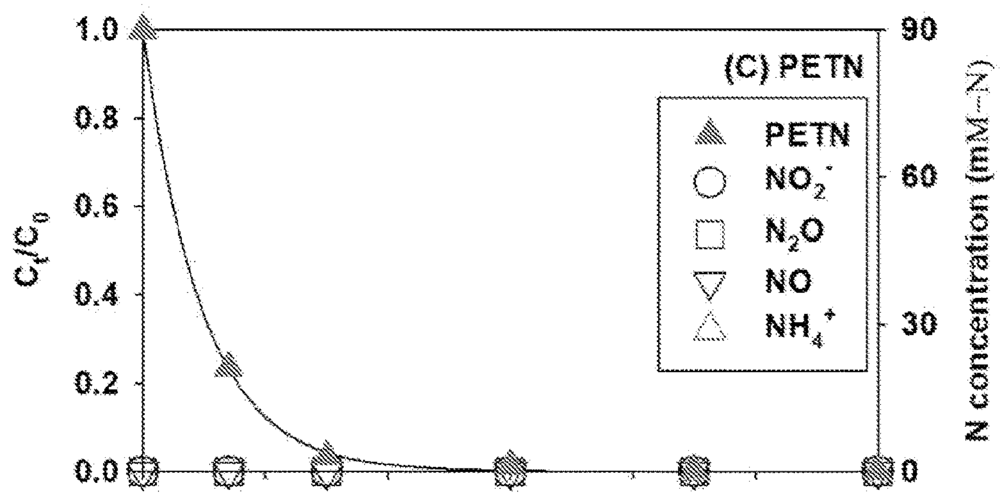
Figure 3D:
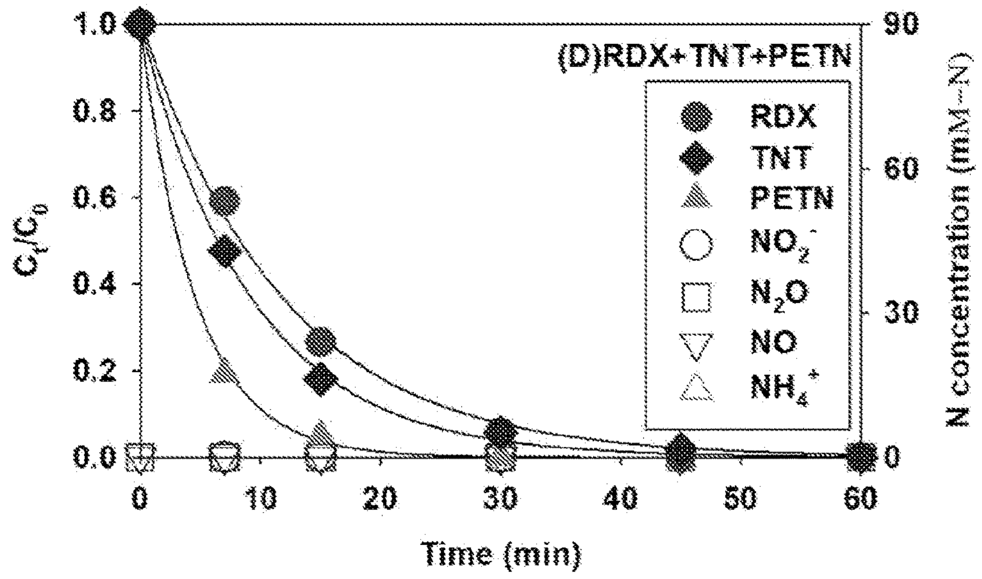

FIGS. 3B and 3C show that TNT and PETN also were removed with pseudo-first rate constants of 0.13 and 0.21 $min^{-1}$, respectively. FIG. 3D also shows that the Pd-biofilm was able to concomitantly remove RDX, TNT, and PETN with similar reaction rates and >99% total removal within one hour.

Figure 4:
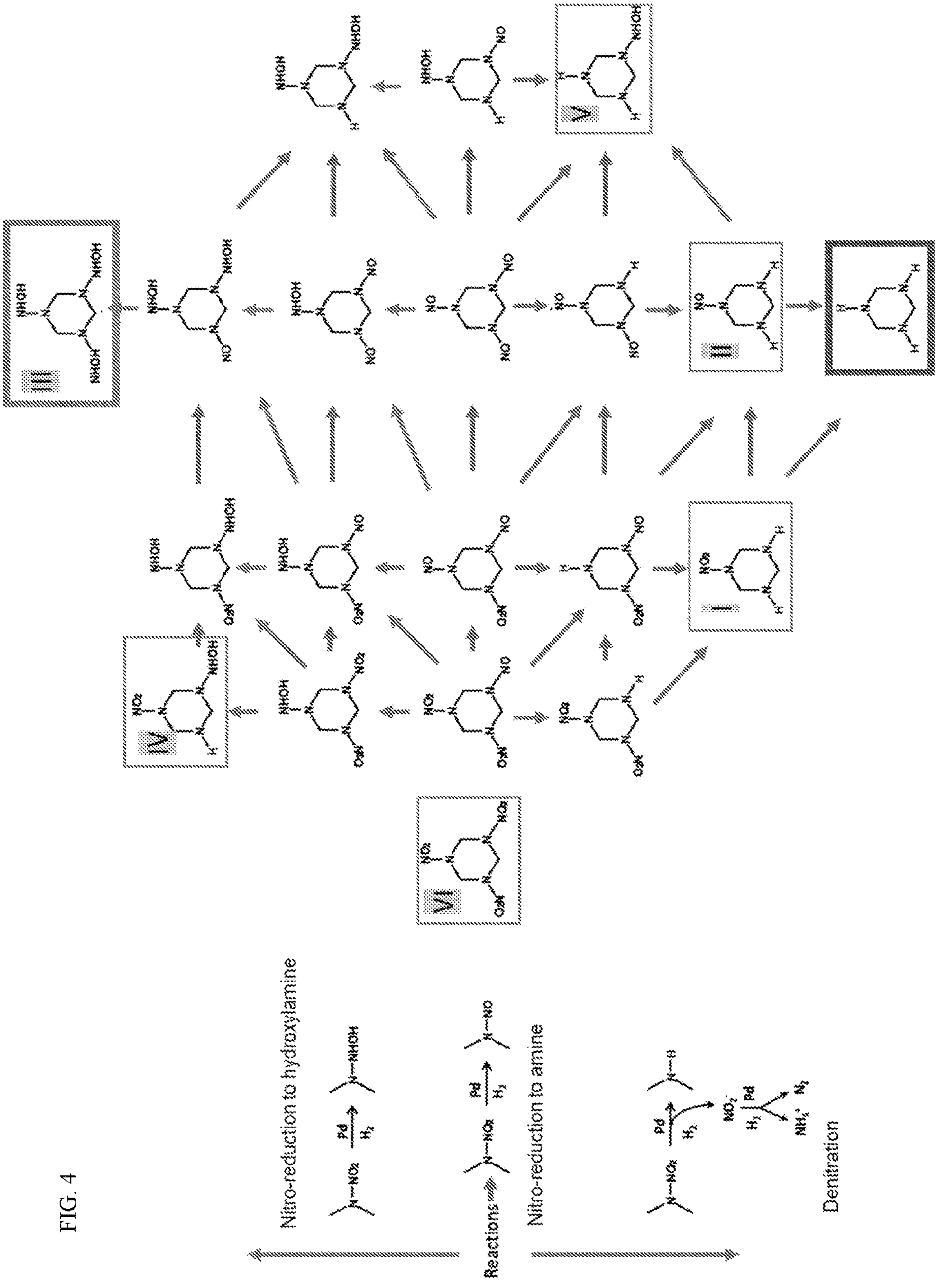
FIG. 4 depicts, in accordance with certain embodiments, a postulated pathway of RDX transformation catalyzed by Pd-biofilm. The reactions in the left guided the degradation mechanisms with the corresponding directions in the right. The six high signal intermediates are labeled with orange open rectangle. The orange and green open rectangle with thick lines are the two main products.

Further analyses of the organic intermediates reveal a map of all possible pathways for Pd-catalyzed RDX decomposition illustrated in FIG. 4. The six most abundant intermediates are labeled with orange open rectangles. The orange and green open rectangles with thick lines are the two main products. According to this scheme of Pd catalysis, RDX is reduced following three main reactions: (a) nitro-reduction to hydroxylamine: Pd assisted the hydroxylation of nitroso groups (N—NO) or nitro groups (N—$NO_2$) to hydroxylamine derivatives (N—NHOH); (b) nitro-reduction to amine: Pd catalyzed the sequential reduction of N—$NO_2$ to the corresponding N—NO groups; and (c) denitration: A N—$NO_2$ or =N—NO linkage was catalytically cleaved to form N—H.

The $NO_2^-$ decomposed from the RDX was sequentially reduced with Pd to create $N_2$ or $NH_4^+$.

Figure 5:
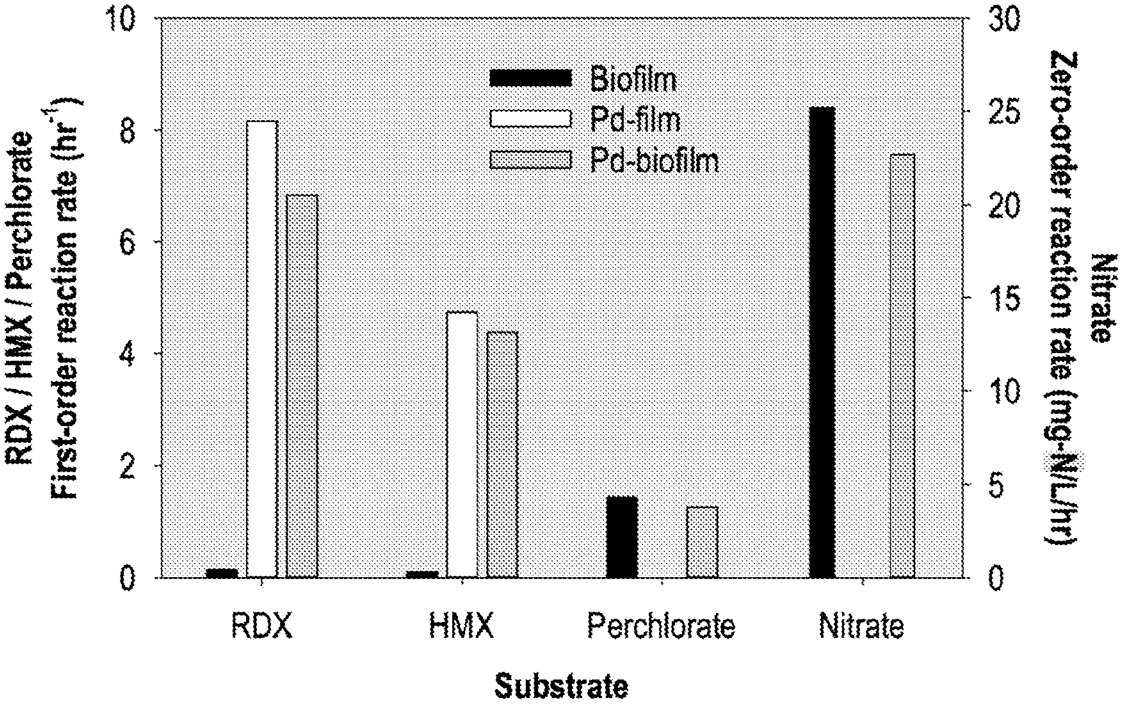
FIG. 5 depicts, in accordance with certain embodiments, reaction rates of separate removals of RDX, HMX, nitrate, and perchlorate catalyzed by Biofilm, Pd-film, and Pd-biofilm.

3. Treatment of Ammunition Contaminated Water by the Bio-Metal Composite Catalyst: An Example of Simultaneous Removal of RDX, HMX, Nitrate, and Perchlorate by the Pd-Biofilm A series of batch tests of separated RDX, HMX, perchlorate, and nitrate removals were conducted in the biofilm before and after palladium addition ("biofilm" as the biocatalyst and "Pd-biofilm" as the bio-metal composite catalyst), and an abiotic bare fiber supporting $Pd^0$NP film synthesized via autocatalytic reduction of Pd(II) in the same catalyst precursor medium ("Pd-film" as the metal catalyst). Pd-catalysis by Pd-film was only able to rapidly destroy explosives and could not reduce nitrate and perchlorate (FIG. 5). On the other hand, microbial catalysis by biofilm was able to rapidly remove nitrate and perchlorate, but the enzymatic rate for destroying the explosives was too slow to be practical; 90% destruction of 0.1-mg/L RDX or HMX took over 15 days, which were 1/20 of the Pd-catalytic rate (FIG. 5). Interestingly, coupled bio- and Pd-catalysis by Pd-biofilm was capable of effective and rapid removal of explosives and oxyanions.

Figure 6:
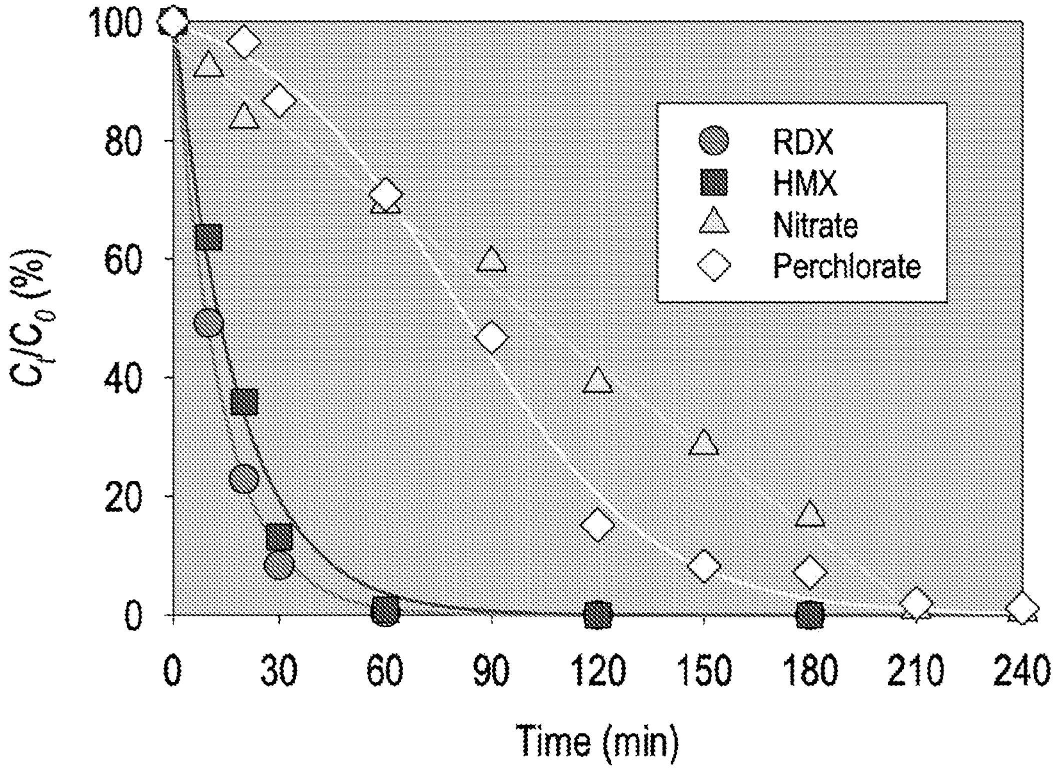
FIG. 6 depicts, in accordance with certain embodiments, simultaneous removal of RDX, HMX, $NO_3^-$, and $ClO_4^-$ by Pd-biofilm.

In a further test, a synthetic ammunition wastewater featuring RDX, HMX, nitrate, and perchlorate was successfully treated in a Pd-biofilm system within four hours (FIG. 6), which verifies that the bio-metal composite catalysis was able to efficiently remove explosives and oxyanions as a one-pot solution.

Figure 7:
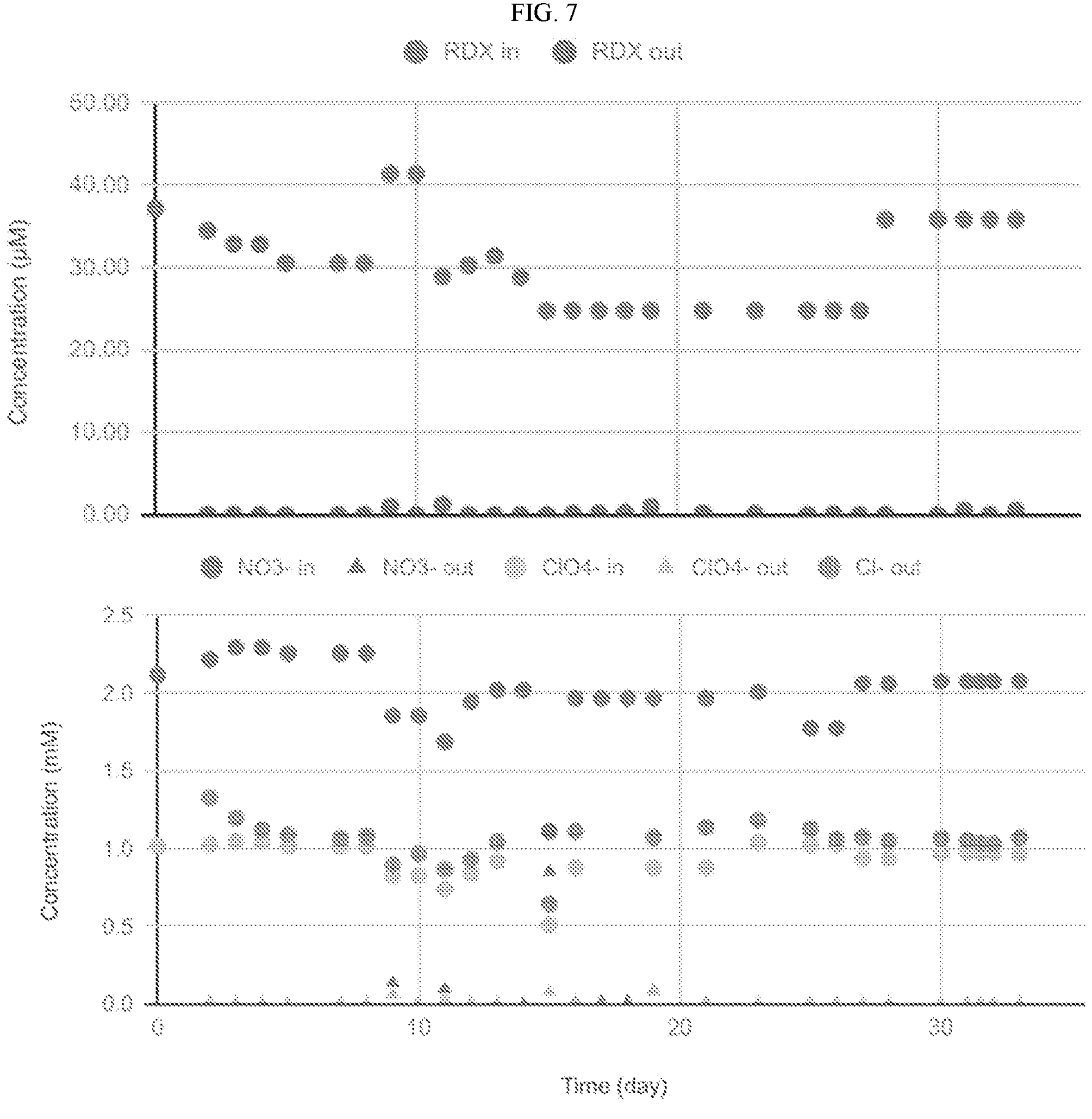
FIG. 7 depicts, in accordance with certain embodiments, results of continuous removal of RDX, $NO_{3-}$, and $ClO_4^-$ from ammunition wastewater.

FIG. 7 present the continuous co-removal of 5 mg/L RDX, 28 mg-N/L $NO_3^-$, and 100 mg/L $ClO_4^-$ by the Pd-biofilm during 33 days of continuous operation at a hydraulic retention time (HRT) of 8 hours. Over 99.8% of the substrates were removed mostly throughout the 33-day test, and the effluent concentrations of RDX (0.01 mg/L), $NO_3^-$ (0.05 mg-N/L), and $ClO_4^-$ (0.01 mg/L) were below the EPA MCLs. The removal fluxes of RDX, $NO_3^{-1}$—N, and $ClO_4^-$ were 0.1, 0.6, and 2.0 g/m$^2$/d, respectively.

Figure 8A:
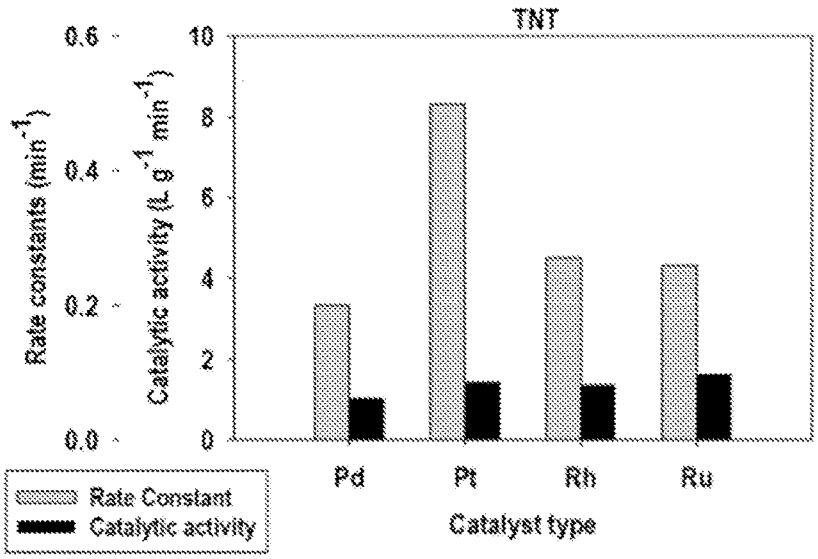
FIGS. 8A-8C depict, in accordance with certain embodiments, the performance of metal catalysts comprising Pd, Pt, Rh, or Rh in removing 2,4,6-trinitrotoluene (TNT), 1,3,5-Trinitro-1,3,5-triazinane (RDX), and pentaerythritol tetranitrate (PETN).
Figure 8B:
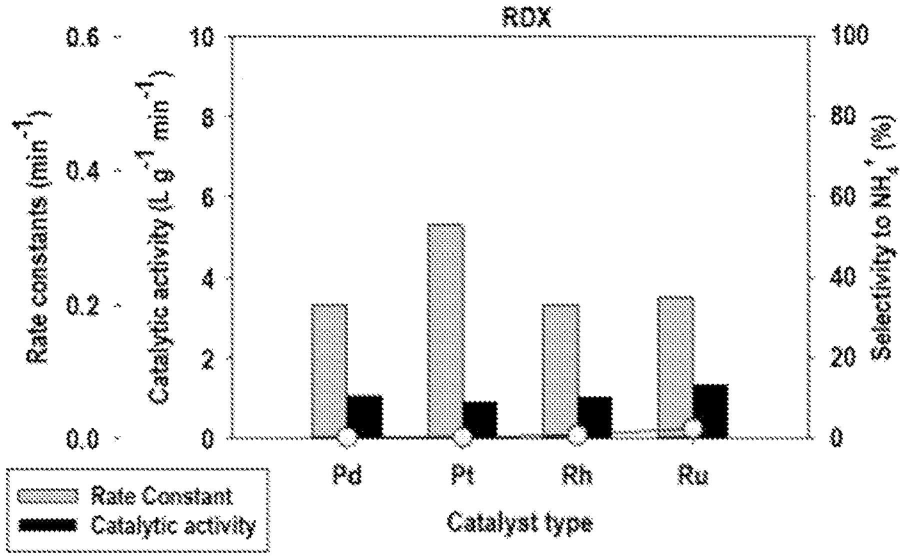
Figure 8C:
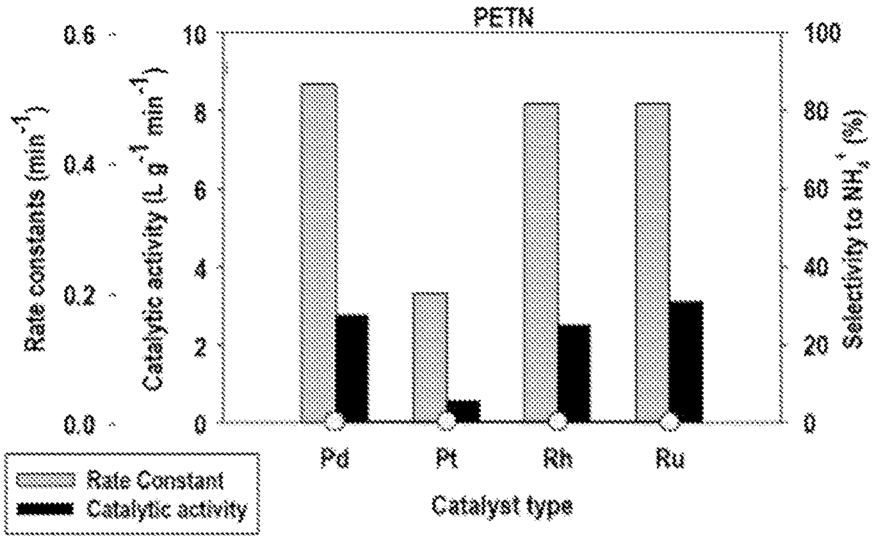

4. Metal Catalysts Other than Pd for the Removal of Ammunitions-Related Contaminants Similar to Pd, other platinum group metals (Pt, Rh, and Ru) can be autocatalytically reduced and embedded in the biofilm. FIGS. 8A-C show the rate constants and catalytic activities for energetics removal by platinum-group metals catalysts other than Pd. The catalyst-specific activities for Pd, Rh, and Ru were similar when catalyzing the reductions of TNT (0.82-1.67 $L \cdot min^{-1} \cdot g\ cata^{-1}$; FIG. 8A), RDX (1.37-1.81 $L \cdot min^{-} \cdot gcata^{-1}$; FIG. 8B), or PETN (2.72-3.43 $L \cdot min^{-1} \cdot gcata^{-1}$; FIG. 8C). Pt had similar performance to the other three PGMs for TNT or RDX, but its catalytic activity for PETN reduction (0.6 $L \cdot min^{-1} \cdot gcata^{-1}$) was 5-fold lower than the other three PGMs.

Bimetal catalysts, such as Pd/Pt, Pd/Ru, Pd/Rh, and Pd/Au, also can catalyze the reduction of energetics, with 10 mg/L energetics completely removed in 60 minutes. However, the catalysts with two metals had lower reduction rates than a catalyst film comprising Pd alone (5%~40% lower).

What is claimed is:

1. A system for establishing a metal-biofilm for removing explosives and oxyanions, the system comprising:
- a gas-transfer membrane;
- a hydrogen-gas source;
- an inoculant comprising a biofilm-forming population of microorganisms;
- a growth medium comprising at least one nitrate salt and at least one perchlorate salt, wherein the growth medium feeds biofilm-forming population of microorganisms to establish a biofilm anchored on the gas-transfer membrane and the biofilm comprises perchlorate-reducing bacteria; and
- a catalyst precursor medium comprising at least one soluble autocatalytic metal precursor and having a basic pH, wherein the catalyst precursor medium feeds the biofilm, and the biofilm converts the soluble autocatalytic metal precursor to autocatalytic metal nanoparticles, which are embedded in the biofilm matrices to produce a metal-biofilm that is anchored on the gas-transfer membrane and the metal-biofilm reduces explosives and oxyanions from a fluid.

2. The system of claim 1, wherein the least one soluble autocatalytic metal precursor is selected from platinum group metals.

3. The system of claim 1, wherein the concentration of the at least one soluble autocatalytic metal precursor in the catalyst precursor medium is 0.1-5 mM.

4. The system of claim 1, wherein the inoculant comprises a $H_2$-utilizing autotroph capable of reducing oxyanions, a $H_2$-utilizing autotroph capable of reducing precious metals, and a heterotroph capable of degrading organics.

5. The system of claim 4, wherein the inoculant comprises bacteria from the classes Betaproteobacteria, Alphaproteobacteria, and Saprospirae.

6. The system of claim 5, wherein the inoculant further comprises bacteria from at least one class selected from the group consisting of: Clostridia, Flavobacteria, Bacteroidia, and Methanobacteria.

7. The system of claim 1, wherein the inoculant comprises a member from *Rhodocyclus*, Rhizobiales, and *Chitinophagaceae.*

8. The system of claim 7, wherein the inoculant further comprises a member of Azospira, Rhodocyclaceae, *Dysgonomonas*, and *Bacteroidales.*

9. The system of claim 1, wherein the at least one nitrate salt in the growth medium provides a concentration of nitrate of at least 14 mg-N/L and the at least one perchlorate salt provides a concentration of $ClO_4^-$ of at least 10 mg/L.

10. The system of claim 7, wherein the at least one nitrate salt in the growth medium provides a concentration of nitrate of 14-48 mg-N/L and the at least one perchlorate salt provides a concentration of $ClO_4^-$ of 10-200 mg/L.

11. The system of claim 7, wherein the growth medium comprises 300-350 mg/L $NaNO_3$ and 240-245 mg/L $NaClO_4$.

12. A method of removing ammunition-related contaminants in a fluid comprising:

providing an aqueous system, wherein the aqueous system comprises a gas-transfer membrane and a hydrogen-gas source; and inoculating the gas-transfer membrane with an inoculant to establish a biofilm anchored to the gas-transfer membrane;

providing the inoculated aqueous system with a growth medium comprising at least one nitrate salt and at least one perchlorate salt, wherein growth medium establishes a biofilm on the gas-transfer membrane;

providing the aqueous system with a catalyst precursor medium comprising at least one soluble autocatalytic metal precursor and having a basic pH, wherein the catalyst precursor medium feeds the biofilm, and the biofilm converts the soluble autocatalytic metal precursor to autocatalytic metal nanoparticles, which are embedded in the biofilm matrices to produce a metal-biofilm that is anchored on the gas-transfer membrane; and providing to the metal-biofilm the fluid with ammunition-related contaminants, wherein the metal-biofilm reduces explosives and oxyanions thereby removing the ammunition-related contaminants in the fluid.

13. The method of claim 12, further comprising adjusting the pH of the fluid with ammunition-related contaminants to a neutral pH.

14. The method of claim 12, wherein the pH of the fluid with ammunition-related contaminants is a neutral pH.

15. The method of claim 13, wherein the concentration of the at least one soluble autocatalytic metal precursor in the catalyst precursor medium is 2 mM.

16. A system for removing explosives and oxyanions from a fluid comprising:

a gas-transfer membrane;

a hydrogen-gas source;

autocatalytic metal nanoparticles; and a biofilm comprising a $H_2$-utilizing autotroph capable of reducing oxyanions, a $H_2$-utilizing autotroph capable of reducing precious metals, and a heterotroph capable of degrading organics, wherein the autocatalytic metal nanoparticles are embedded in the matrices of the biofilm and the biofilm in combination with the autocatalytic metal nanoparticles reduces explosives and oxyanions from a fluid.

17. The system of claim 16, wherein the autocatalytic metal nanoparticles are nanoparticles of at least one platinum group metal.

18. The system of claim 16, wherein the biofilm comprises bacteria from the classes Betaproteobacteria, Alphaproteobacteria, and Saprospirae.

19. The system of claim 16, wherein the biofilm further comprises bacteria from at least one class selected from the group consisting of: Clostridia, Flavobacteria, Bacteroidia, and Methanobacteria.

20. The system of claim 16, wherein the biofilm comprises *Rhodocyclus*, Rhizobiales, and *Chitinophagaceae.*

* * * * *